(12) United States Patent
Shoji et al.

(10) Patent No.: US 7,425,376 B2
(45) Date of Patent: Sep. 16, 2008

(54) FERRITE SUBSTRATE FOR THIN-FILM INDUCTORS, THIN-FILM COMMON MODE FILTER USING THE SUBSTRATE, AND THIN-FILM COMMON MODE FILTER ARRAY USING THE SUBSTRATE

(75) Inventors: Shigeru Shoji, Tokyo (JP); Akira Sato, Tokyo (JP); Yukio Kawaguchi, Tokyo (JP); Kazumitsu Tanaka, Tokyo (JP); Toshikazu Tanishima, Tokyo (JP)

(73) Assignee: TDK Corporation, Chuo-ku, Tokyo (JP)

( * ) Notice: Subject to any disclaimer, the term of this patent is extended or adjusted under 35 U.S.C. 154(b) by 0 days.

(21) Appl. No.: 11/607,065

(22) Filed: Dec. 1, 2006

(65) Prior Publication Data

US 2007/0077458 A1 Apr. 5, 2007

Related U.S. Application Data

(62) Division of application No. 10/862,533, filed on Jun. 8, 2004, now Pat. No. 7,387,847.

(30) Foreign Application Priority Data

Jun. 9, 2003 (JP) ............................. 2003-163563

(51) Int. Cl.
*B32B 9/00* (2006.01)

(52) U.S. Cl. ...................... 428/701; 428/469; 428/702; 252/62.56; 501/126

(58) Field of Classification Search ...................... None
See application file for complete search history.

(56) References Cited

U.S. PATENT DOCUMENTS

2004/0031946 A1* 2/2004 Inagaki et al. .............. 252/62.6

FOREIGN PATENT DOCUMENTS

| JP | 61-117805 | 6/1986 |
|---|---|---|
| JP | 62-260306 | 11/1987 |
| JP | 08-203737 | 8/1996 |
| JP | 11-054326 | 2/1999 |
| JP | 2003-109814 | 4/2003 |

OTHER PUBLICATIONS

Chinese Office Action, with English-language translation, dated Apr. 6, 2007.

* cited by examiner

*Primary Examiner*—Timothy M Speer
(74) *Attorney, Agent, or Firm*—Frommer Lawrence & Haug, LLP

(57) ABSTRACT

A ferrite substrate for thin-film inductors is provided by means of blending raw materials to meet a composition of di-iron trioxide ($Fe_2O_3$): 40 to 55 mol %, nickel oxide (NiO): 5 to 35 mol %, zinc oxide (ZnO): 10 to 40 mol %, and bismuth trioxide ($Bi_2O_3$): 150 to 750 ppm, or of $Fe_2O_3$: 40 to 55 mol %, NiO: 5 to 35 mol %, ZnO: 10 to 40 mol %, cupric oxide (CuO): 5 to 10 mol %, and manganese dioxide ($MnO_2$): 0.5 to 2 mol %, and then molding and sintering the blended material, and applying hot isostatic pressing to the sintered article. A thin-film common mode filter and a thin-film common mode filter array using the ferrite substrate and the manufacturing method of the substrate are also provided.

12 Claims, 17 Drawing Sheets

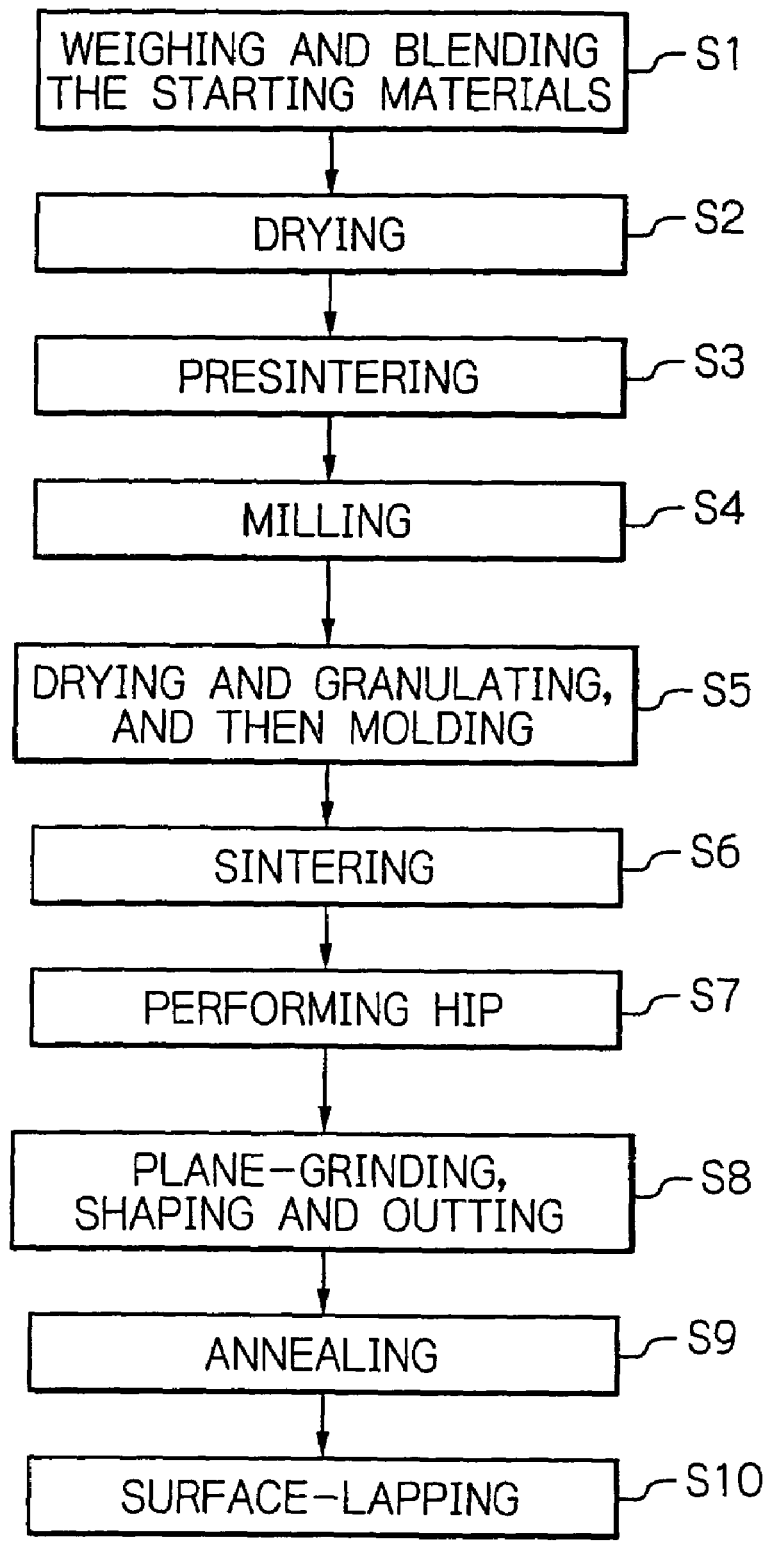

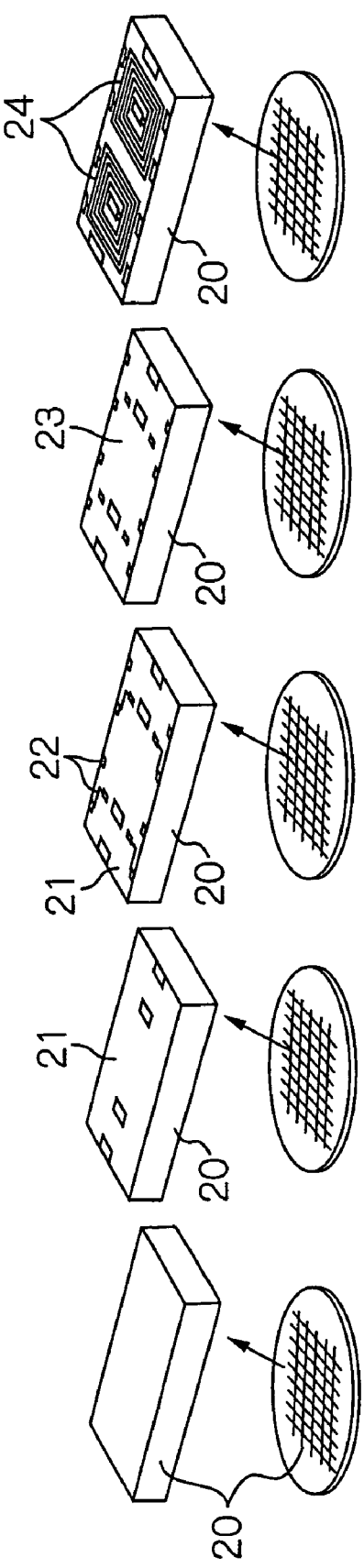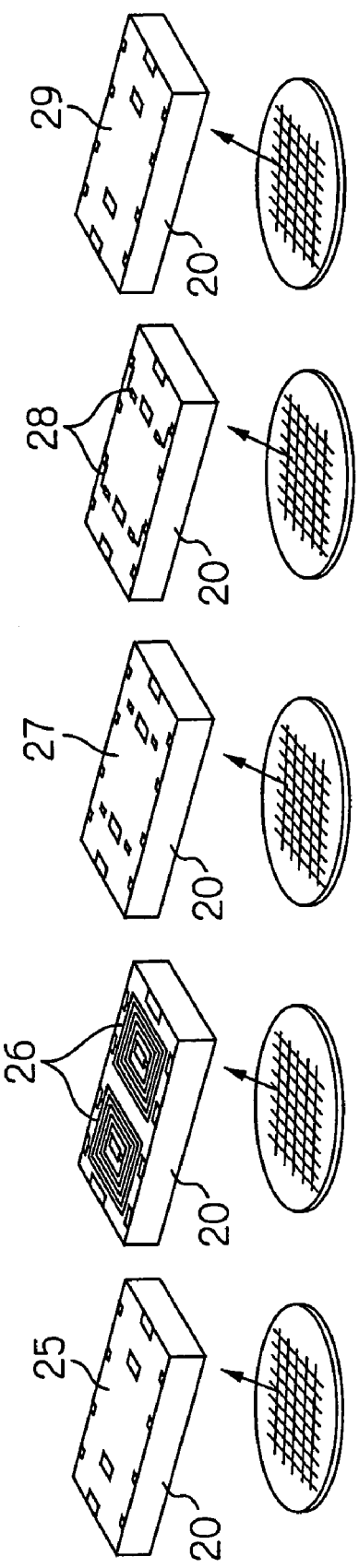

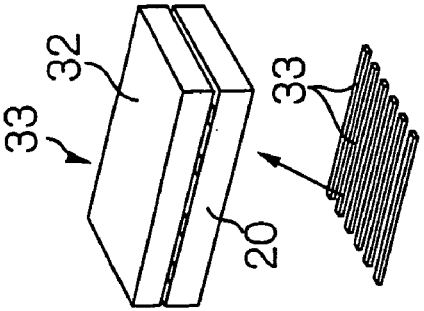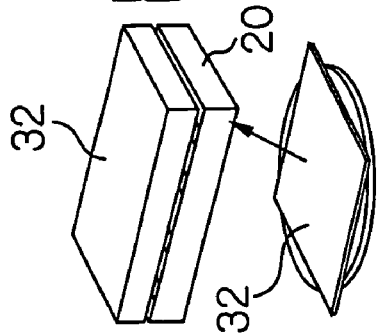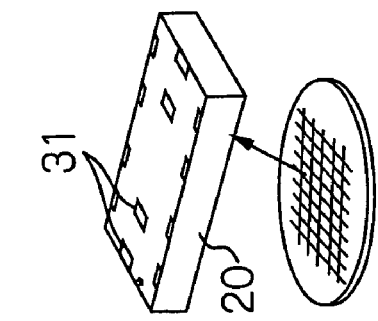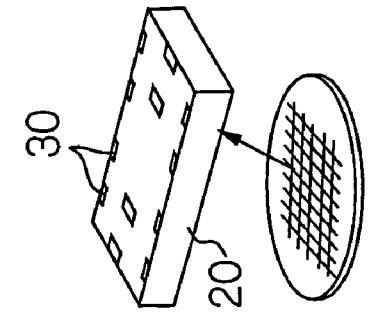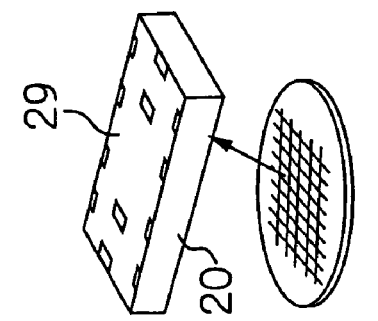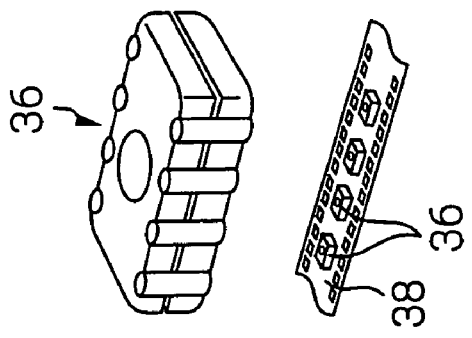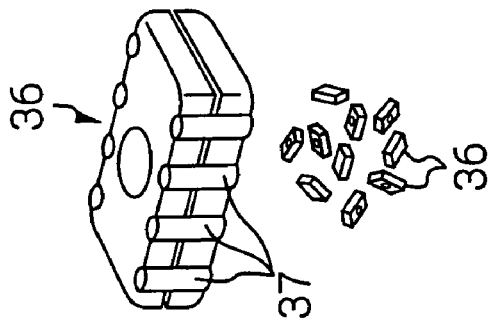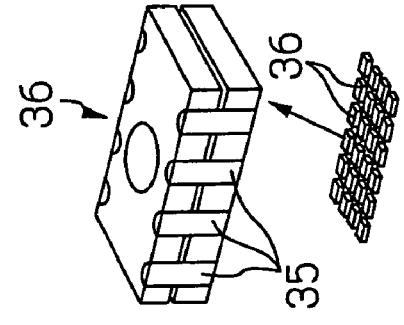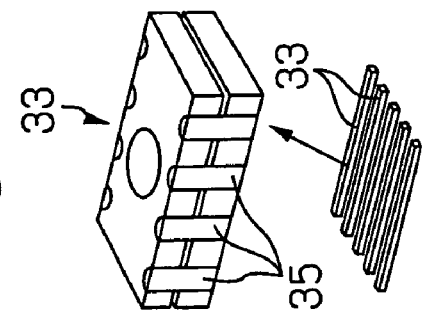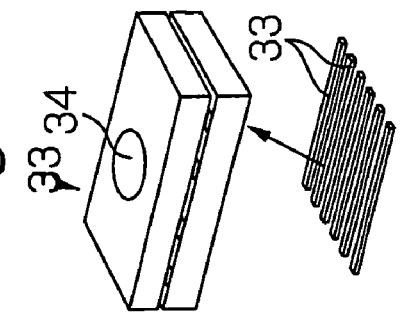

FERRITE SUBSTRATE FOR THIN-FILM INDUCTORS, THIN-FILM COMMON MODE FILTER USING THE SUBSTRATE, AND THIN-FILM COMMON MODE FILTER ARRAY USING THE SUBSTRATE

CROSS REFERENCE TO RELATED APPLICATION

This application is a divisional application of application Ser. No. 10/862,533, filed Jun. 8, 2004 now U.S. Pat. No. 7,387,847.

PRIORITY CLAIM

This application claims priority from Japanese patent application No. 2003-163563, filed on Jun. 9, 2003, which is incorporated herein by reference.

BACKGROUND OF THE INVENTION

1. Field of the Invention

The present invention relates to a ferrite substrate for thin-film inductors, to a thin-film common mode filter using the substrate, to a thin-film common mode filter array using the substrate, and to a manufacturing method of the substrate.

2. Description of the Related Art

Common mode filter is a device for suppressing common mode currents that cause electromagnetic interference in parallel transmission lines. The common mode filter has magnetically coupled inductors to remove in-phase noise component.

Thin-film common mode filter miniaturized and highly integrated by forming bilayered thin-film coils between ferrite substrates and by constructing in chip form, and thin film common mode filter array on which a plurality of the filters are mounted, are described in for example, Japanese Patent Publications Nos. 08-203737A and 11-054326A.

Generally, such a ferrite substrate is produced by hot forming press method where a hot-pressed block is cut out into substrates with a desired shape and the substrates are then lapped and formed, or by sheet manufacturing method where sheeted ferrites are stacked and pressed with heat and the stacked ferrite is then lapped and formed into a desired shape.

In the thin-film common mode filter, coils are disposed closely to each other in order to satisfy it's characteristic request and high voltage is applied to these coils. Thus, such filter is required to have high withstand voltage and high reliability in electrical isolation. Also, required is that terminals of the filter should be electrically isolated with each other and formed finely without causing electrical isolation failure between coils. Furthermore, the filter should have miniaturized coils and ferrite substrates with a permeability of about 100-400 in order to be operable at a high frequency (several GHz) band.

Conventional ferrite substrate for the thin-film common mode filter, however, has a porous crystalline structure with voids and such on its surface, which causes low insulation resistance on its surface and large surface-degradation. The ferrite substrate, therefore, has too poor mechanical strength to undergo thin-film process, and moreover, it has been difficult to form precisely the terminals on the substrate surface.

BRIEF SUMMARY OF THE INVENTION

It is therefore an object of the present invention to provide a ferrite substrate for thin-film inductors, with a higher surface insulation resistance and less surface-degradation, a thin-film common mode filter using the substrate, a thin-film common mode filter array using the substrate, and a manufacturing method of the substrate.

Another object of the present invention is to provide a ferrite substrate for thin-film inductors with a high mechanical strength, a thin-film common mode filter using the substrate, a thin-film common mode filter array using the substrate, and a manufacturing method of the substrate.

A further object of the present invention is to provide a ferrite substrate for thin-film inductors, on a surface of which terminals can be precisely formed without difficulty, a thin-film common mode filter using the substrate, a thin-film common mode filter array using the substrate, and a manufacturing method of the substrate.

According to the present invention, a ferrite substrate for thin-film inductors is provided, which contains a ferrite composition of di-iron trioxide ($Fe_2O_3$): 40 to 55 mol %, nickel oxide (NiO): 5 to 35 mol %, zinc oxide (ZnO): 10 to 40 mol %, and bismuth trioxide ($Bi_2O_3$): 150 to 750 ppm, or of $Fe_2O_3$: 40 to 55 mol %, NiO: 5 to 35 mol %, ZnO: 10 to 40 mol %, cupric oxide (CuO): 5 to 10 mol %, and manganese dioxide ($MnO_2$): 0.5 to 2 mol %, and which has a densified crystalline structure developed by hot isostatic pressing (HIP). Also, a thin-film common mode filter and a thin-film common mode filter array, which are produced from a part of the substrate, are provided.

More preferably, the substrate contains a ferrite composition of $Fe_2O_3$: 40 to 55 mol %, NiO: 15 to 30 mol %, ZnO: 20 to 40 mol %, and $Bi_2O_3$: 150 to 750 ppm, or of $Fe_2O_3$: 40 to 55 mol %, NiO: 15 to 30 mol %, ZnO: 20 to 40 mol %, CuO: 5 to 10 mol %, and $MnO_2$: 0.5 to 2 mol %.

By being given the crystalline structure densified by HIP with the above-mentioned ferrite composition, the substrate achieves high surface insulation resistance of $2 \times 10^{10}$ $\Omega \cdot cm$ or more, and the common mode filter produced from the substrate can acquire enough electrical isolation between the coils. And, there is no change (degradation) in bulk insulation resistance and surface insulation resistance of the substrate after being annealed in the thin film process. Further, mechanical strength (bending strength) of the substrate is enhanced to the value at least 1.5 times larger than that of substrate produced by conventional hot forming press method, which is a enough strength for the substrate to undergo the thin film process. Furthermore, the densified substrate-surface with almost no voids can prevent electrical trouble due to plating on unwanted portion when the terminals and the like are formed by plating. In addition, the terminal patterns are able to being formed precisely because of the densified substrate-surface.

Preferably, the substrate is a wafer with diameter of 3 inches or more.

According to the present invention, a manufacturing method of a ferrite substrate for thin film inductors is further provided, which includes a step of blending, and adding if needed, raw materials to meet a composition of $Fe_2O_3$: 40 to 55 mol %, NiO: 5 to 35 mol %, ZnO: 10 to 40 mol %, and $Bi_2O_3$: 150 to 750 ppm, or of $Fe_2O_3$: 40 to 55 mol %, NiO: 5 to 35 mol %, ZnO: 10 to 40 mol %, CuO: 5 to 10 mol %, and $MnO_2$: 0.5 to 2 mol %, and a step of molding and sintering the blended material, and then applying HIP to the sintered article.

More preferably, the method includes a step of blending raw materials to meet a composition of $Fe_2O_3$: 40 to 55 mol %, NiO: 15 to 30 mol %, ZnO: 20 to 40 mol %, and $Bi_2O_3$: 150 to 750 ppm, or of Fe$_2$O$_3$: 40 to 55 mol %, NiO: 15 to 30 mol %, ZnO: 20 to 40 mol %, CuO: 5 to 10 mol %, and MnO$_2$: 0.5 to 2 mol %.

By undergoing HIP, after being set into the above-mentioned ferrite composition and sintered, the obtained substrate achieves a high surface insulation resistance value of 2×10$^{10}$ Ω·cm or more, and the common mode filter produced from the substrate can acquire enough electrical isolation between the coils. Further, there is no change or degradation in bulk insulation resistance and surface insulation resistance of the substrate after being annealed in the thin film process. Further, mechanical strength or bending strength of the substrate is enhanced to the value at least 1.5 times larger than that of substrate produced by conventional hot forming press method, which is a enough strength for the substrate to undergo the thin film process. Furthermore, the densified substrate-surface with almost no voids can prevent electrical trouble due to plating on unwanted portion when the terminals and like are formed by plating. In addition, the terminal patterns are able to being formed precisely because of the densified substrate-surface.

Preferably, the method further includes a step of annealing the obtained article and surface-lapping the annealed article with the amount of lapping at least 5 μm after applying HIP to the article.

Further objects and advantages of the present invention will be apparent from the following description of the preferred embodiments of the invention as illustrated in the accompanying drawings.

BRIEF DESCRIPTION OF THE SEVERAL VIEWS OF THE DRAWINGS

FIG. 1 shows a flow diagram schematically illustrating some steps in a preferred embodiment of a manufacturing method of a ferrite substrate for thin-film inductors according to the present invention;

FIGS. 2a to 2j show perspective views for explanation of a wafer process to produce a thin-film common mode filter array;

FIGS. 3a to 3j show perspective views for explanation of a working process to produce the thin-film common mode filter array;

DETAILED DESCRIPTION OF THE INVENTION

Figure 4:
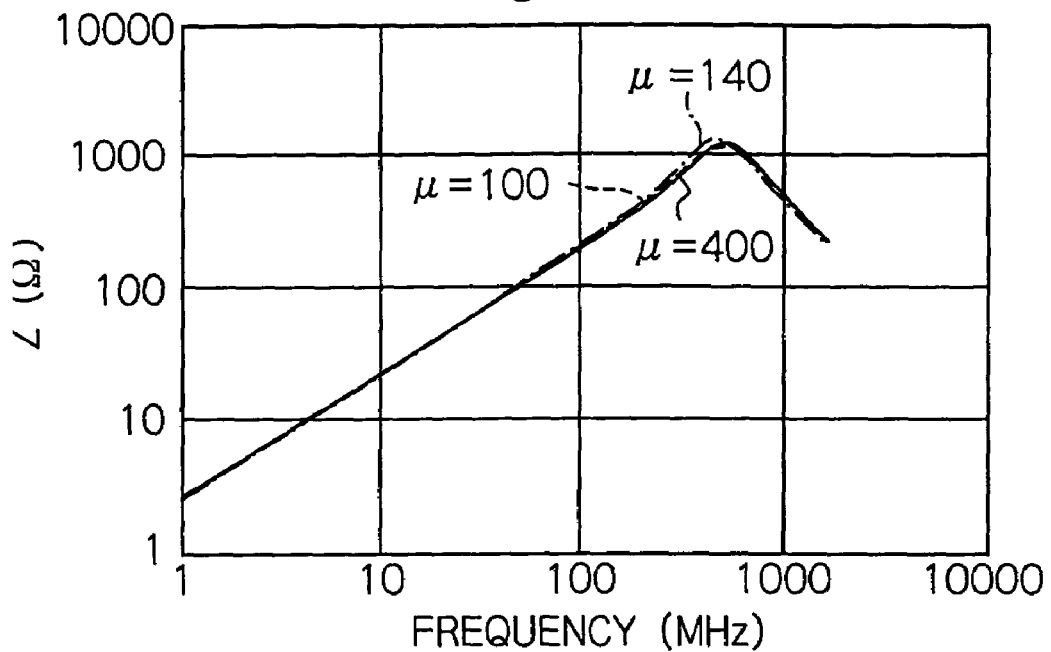
FIG. 4 shows a graph illustrating common mode characteristic of a thin-film common mode filter.

FIG. 1 schematically illustrates some steps in a preferred embodiment of a manufacturing method of a ferrite substrate for thin-film inductors according to the present invention. The manufacturing steps of the ferrite substrate will be described in detail with reference to the figure hereafter.

First Example of the Substrate Composition

First, raw materials are weighed according to the blend table so that obtained ferrite substrates will have a predetermined composition, and then are blended by adding purified water (step S1). The predetermined composition is $Fe_2O_3$: 40 to 55 mol %, NiO: 15 to 30 mol %, and ZnO: 20 to 40 mol %.

Next, the obtained blended slurry is dried (step S2), and presintered (step S3).

Then, the obtained presintered material is milled with purified water (step S4). The milling is accompanied by adding 150 to 750 ppm in $Bi_2O_3$. $CaCO_3$ and such also may be added.

Next, the obtained milled material is dried and granulated, and then is molded (step S5). Further, it is sintered (step S6), in the atmospheric air as combustion gas at about 1160° C.

Then, the sintered article undergoes HIP (step S7) that is performed for about 2 hours under the pressure of about 1000 kg/cm² at about 1200° C.

Then, the obtained article is plane-grinded, shaped and cut (step S8).

Thereafter, the cut article is heated or annealed (step S9), in the atmospheric air at about 1000° C.

Then, the surface of the annealed article is lapped with the amount of lapping of at least 5 μm, by use of abrasive grain of grit number #2000 (step S10).

Second Example of the Substrate Composition

First, raw materials are weighed according to the blend table so that obtained ferrite substrates will have a predetermined composition, and then are blended by adding purified water (step S1). The predetermined composition is $Fe_2O_3$: 40 to 55 mol %, NiO: 15 to 30 mol %, ZnO: 20 to 40 mol %, CuO: 5 to 10 mol %, and $MnO_2$: 0.5 to 2 mol %.

Next, the obtained blended slurry is dried (step S2), and presintered (step S3).

Then, the obtained presintered material is milled with purified water (step S4). The milling may be accompanied by adding $CaCO_3$ and such.

Next, the obtained milled material is dried and granulated, and then is molded (step S5). Further, it is sintered (step S6), in the atmospheric air as combustion gas at about 1160° C.

Then, the sintered article undergoes HIP (step S7) that is performed for about 2 hours under the pressure of about 1000 kg/cm² at about 1200° C.

Then, the obtained article is plane-grinded, shaped and cut (step S8).

Thereafter, the cut article is heated or annealed (step S9), in the atmospheric at 1000° C.

Then, the surface of the annealed article is lapped with the amount of lapping of at least 5 μm, by use of abrasive grain #2000 (step S10).

By undergoing HIP, after being set into the above-mentioned ferrite composition and sintered, and by being annealed and surface-lapped as mentioned above, the obtained substrate achieves a high surface insulation resistance value of $2 \times 10^{10}$ Ω·cm or more. Further, there is no change (degradation) in bulk insulation resistance and surface insulation resistance in the substrate after being annealed in the thin film process thereafter. Further, mechanical strength (bending strength) of the substrate is enhanced to the value at least 1.5 times larger than that of substrate produced by conventional hot forming press method, which is enough strength for the substrate to undergo the thin film process. Furthermore, the substrate surface becomes densified with almost no voids, as well as the surface in the production process.

FIGS. 2a to 2j and FIGS. 3a to 3j show perspective views for explanation of the wafer process and the working process to produce a thin film common mode filter array that consists of two coupled thin film common mode filters, fabricated from the above-mentioned ferrite substrate. In FIGS. 2a-2j and FIGS. 3a-3j, the lower parts of the view show a wafer, and the upper parts show individual chips that are not actually cut to separate. The manufacturing process of the thin film common mode filter array will be detailed by these figures hereafter.

First, as shown in FIG. 2a, a ferrite wafer that was fabricated by the manufacturing method of FIG. 1 is prepared, and, as shown in FIG. 2b, a first insulating layer 21, made of such as polyimide resin, is coated on the wafer 20, and is then patterned.

Next, as shown in FIG. 2c, first leads and electrodes of a copper layer 22 are formed on the first insulating layer 21. Then, as shown in FIG. 2d, a second insulating layer 23, made of such as polyimide resin, is coated thereon, and patterned.

Then, as shown in FIG. 2e, first coils of a copper layer 24 are formed on the second insulating layer 23. Then, as shown in FIG. 2f, a third insulating layer 25, made of such as polyimide resin, is coated thereon, and patterned.

Then, as shown in FIG. 2g, second coils of a copper layer 26 are formed on the third insulating layer 25. Then, as shown in FIG. 2h, a fourth insulating layer 27, made of such as polyimide resin, is coated thereon, and patterned.

Then, as shown in FIG. 2i, second leads of a copper layer 28 are formed on the fourth insulating layer 27. Then, as shown in FIGS. 2j and 3a, a fifth insulating layer 29, made of such as polyimide resin, is coated thereon, and patterned.

After that, as shown in FIG. 3b, a silver paste 30 is screen-printed on the leads. Then, as shown in FIG. 3c, a ferrite paste 31 for flux return portion is embedded in the core portions.

Then, as shown in FIG. 3d, a ferrite plate cover 32 is bonded on the processed wafer with adhesive.

Then, as shown in FIG. 3e, the obtained wafer is cut into bars 33 on each of which a plurality of thin film common mode filter array chips are aligned.

Then, as shown in FIG. 3f, a mark 34 is printed on the upper side of each of the thin film common mode filter array chips in the bar 33. Then, as shown in FIG. 3g, electrode terminals 35 of Nickel are formed by sputtering on the side of each of the thin film common mode filter array chips in the bar 33.

After that, as shown in FIG. 3h, each bar is cut to separate into individual chips 36. Then, as shown in FIG. 3i, the electrode terminals 35 are formed into bilayer structure 37 of a Nickel layer and a tin layer by barrel plating. Further, as shown in FIG. 3j, the obtained thin film common mode filter array chips 36 are bonded on a tape 38.

The ferrite substrate is required to have high electrical insulation performance in bulk because, as shown in FIG. 3g, the thin film common mode filter and thin film common mode filter array have the electrode terminals formed on the cut surface of the ferrite substrate. And the ferrite substrate is also required to have high surface insulation performance. The thin film common mode filter produced from the substrates is required to have insulation resistance on the order of $10^8$ Ω between the coil terminals. Although there is no perfect proportionality relation between the substrate surface resistance and actual terminal-to-terminal resistance, the substrate is required to have $2 \times 10^{10}$ Ω or more of the combined resistance of the bulk resistance and the surface resistance, to guarantee at least $10^8$ Ω of the insulation resistance. Furthermore, the ferrite substrate is also required to maintain stably high surface insulation performance during such a heat process that is performed in the atmospheric air or Nitrogen gas at more or less 400° C. for heat cure of the insulating layer in the wafer process for forming the thin film common mode filter.

In addition, the ferrite substrate is required not to be cracked or so by mechanical shock or thermal shock in the wafer process because, as shown in FIGS. 2a-2j, the thin film common mode filter and thin film common mode filter array are formed all together on the ferrite substrate. The resistance to such a crack depends on the bending strength of the substrate, therefore the ferrite substrate is required to have higher bending strength. Particularly, the larger is the size of the substrate, the higher bending strength the substrate must have, to enhance its resistance to crack.

Further, as mentioned above, thin film micropatterns are formed on the ferrite substrate in the production process of the thin film common mode filter and thin film common mode filter array, therefore the coated film on the substrate is required not to billow, and the micropatterns are required not to be deformed, due to rough surface of the substrate or so. Usually, smaller degree of surface roughness of the substrate than the thickness of the coated film is required for carrying out the thin film process. For example, in the process of coating the polyimide films, patterning is difficult to be performed on the substrate with surface roughness Rmax of 6 μm or more.

FIG. 4 shows a graph illustrating common mode characteristic of a thin film common mode filter fabricated by the above-mentioned process, that is, frequency dependence of intrinsic impedance Z.

As understood from FIG. 4, the common mode filters, using the substrates made of ferrite materials with various permeability μ about 100 to 1400, acquire almost the same common mode characteristic.

Figure 5:
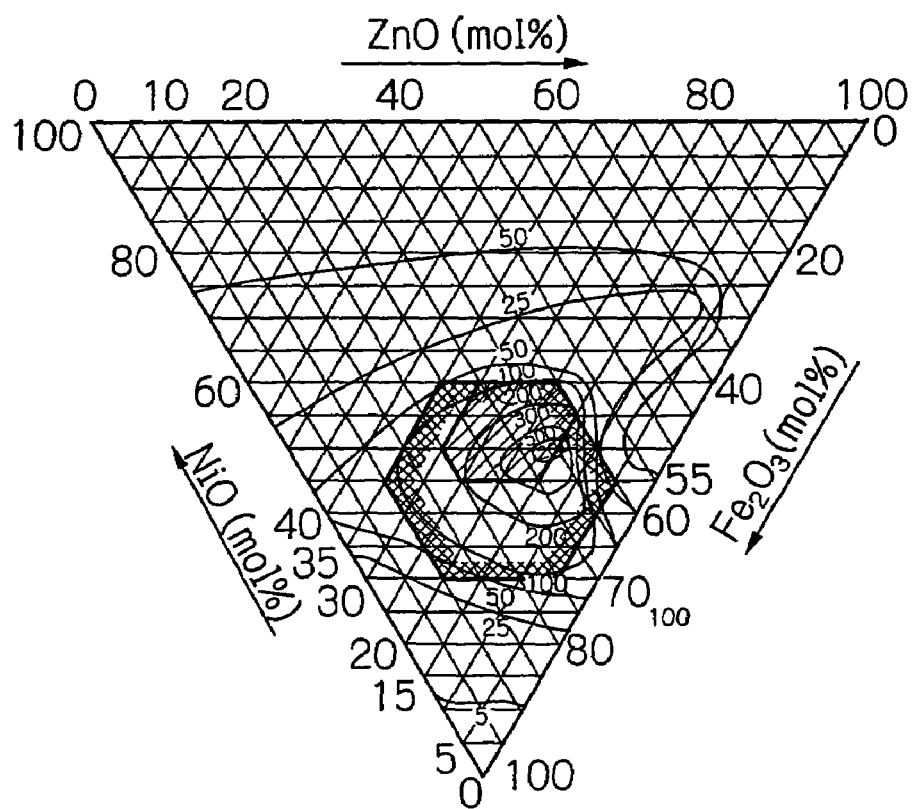
FIG. 5 shows a graph illustrating a relationship among Fe$_2$O$_3$, NiO and ZnO compositions and permeability μ in the ferrite substrates.

FIG. 5 shows a graph illustrating the relationship among $Fe_2O_3$, NiO and ZnO compositions and permeability μ in the ferrite substrates.

As clarified from in FIG. 5, to meet the common mode impedance characteristic of the thin film common mode filter shown in FIG. 4, the ferrite substrate is required to contain a composition in the range of $Fe_2O_3$: 40 to 70 mol %, NiO: 5 to 35 mol %, ZnO: 10 to 40 mol %.

Figure 6:
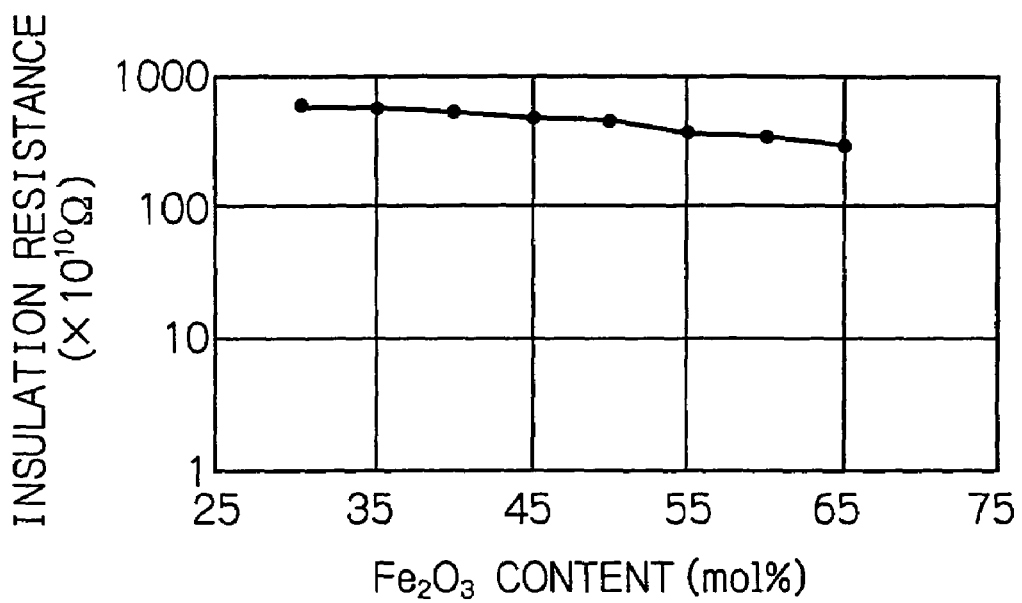
FIG. 6 shows a graph illustrating the measurement results of surface insulation resistance of the ferrite substrates containing various Fe$_2$O$_3$ contents after being sintered.

FIG. 6 shows a graph illustrating the measurement results of surface insulation resistance of the ferrite substrates just after being sintered, which contain various $Fe_2O_3$ contents. And FIG. 7 shows a graph illustrating the measurement results of surface insulation resistance of the sintered ferrite substrates after being surface-lapped.

As understood from FIG. 6, the NiZn ferrite substrates just after being sintered indicate greatly high surface insulation resistance of $10^{12}$ Ω or more in the $Fe_2O_3$ content range from 30 to 65 mol %. Further, the sintered substrates after being surface-lapped maintain greatly high surface insulation resistance.

Figure 7:
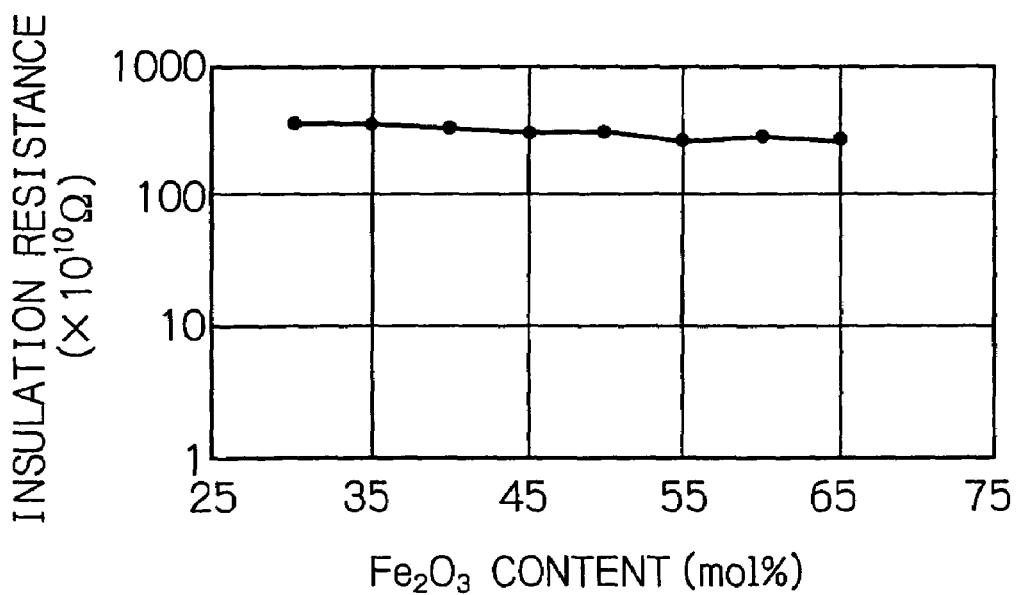
FIG. 7 shows a graph illustrating the measurement results of surface insulation resistance of the sintered ferrite substrates shown in FIG. 6 after being surface-lapped.
Figure 8:
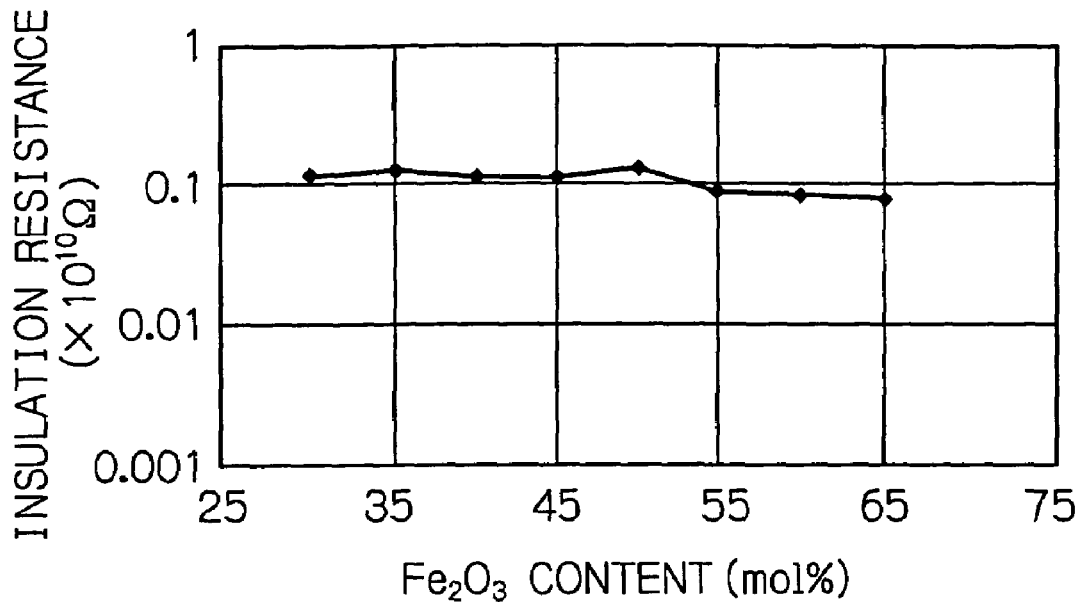
FIG. 8 shows a graph illustrating the measurement results of surface insulation resistance of the ferrite substrates shown in FIG. 7 after being annealed 5 times at a curing temperature of insulating layers (about 400° C.)

FIG. 8 shows a graph illustrating the measurement results of surface insulation resistance of the ferrite substrates shown in FIG. 7, which contain various $Fe_2O_3$ contents, after being annealed (5 times) at a curing temperature of insulating layers (about 400° C.). And FIG. 9 shows a graph illustrating the measurement results of surface insulation resistance of these ferrite substrates after being annealed in vacuum at 1000° C.

As understood from FIG. 8, the substrates annealed repeatedly at the curing temperature of insulating layer show degraded surface insulation performance down to the order of $10^9$ Ω in surface insulation resistance. Further, as understood from FIG. 9, the substrates annealed in vacuum show greatly degraded surface insulation performance down to the order of $10^8$ Ω in surface insulation resistance.

Figure 9:
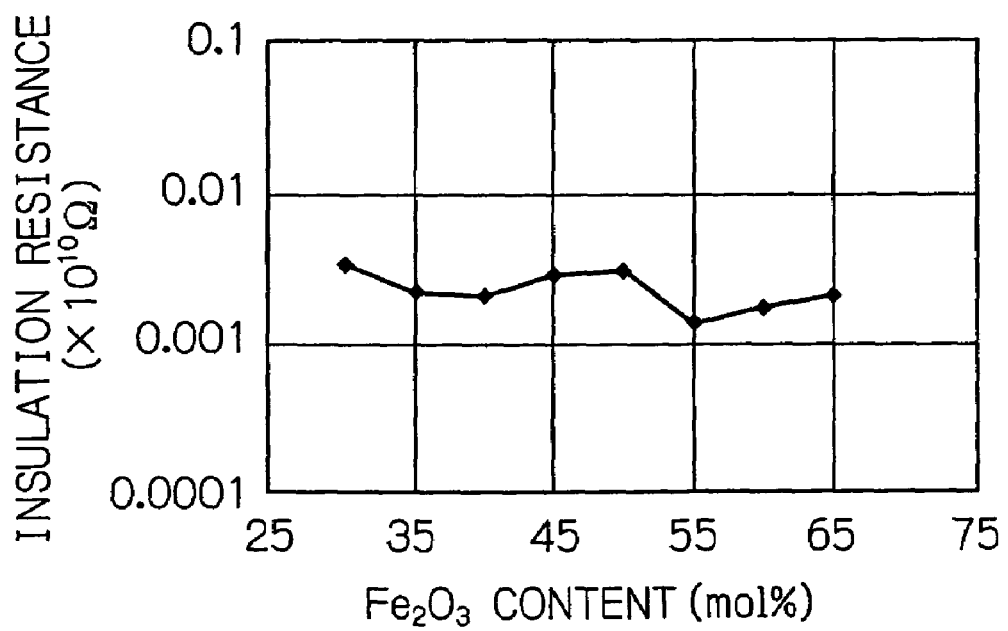
FIG. 9 shows a graph illustrating the measurement results of surface insulation resistance of the ferrite substrates shown in FIG. 8 after being annealed in vacuum at 1000° C.
Figure 10:
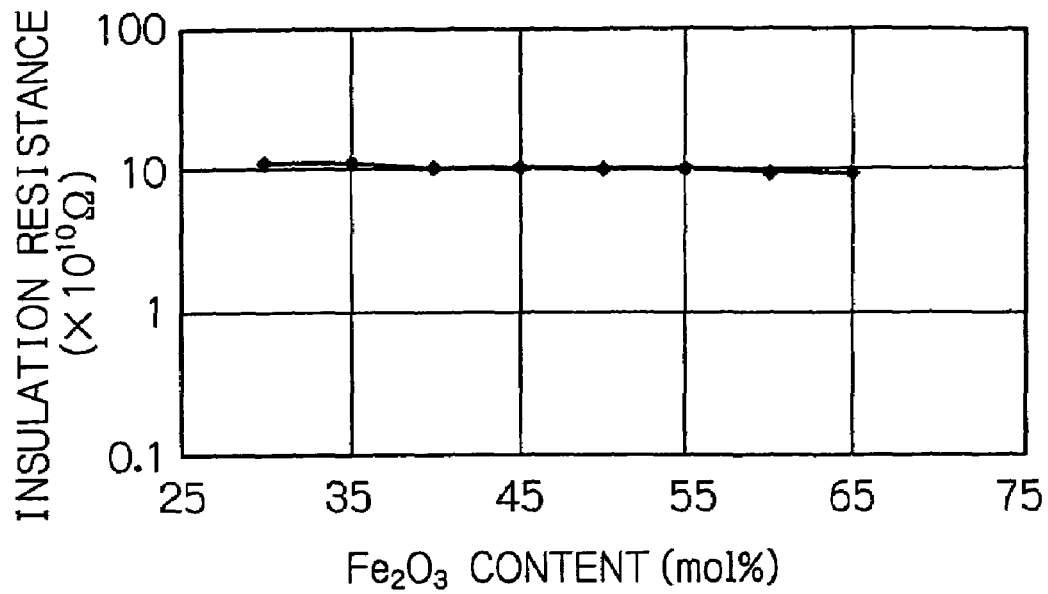
FIG. 10 shows a graph illustrating the measurement results of surface insulation resistance of the annealed-in-vacuum ferrite substrates shown in FIG. 9 after being surface-lapped with the amount of lapping of 5 μm or more.

FIG. 10 shows a graph illustrating the measurement results of surface insulation resistance of the annealed-in-vacuum ferrite substrates shown in FIG. 9 after being surface-lapped with the amount of 5 μm or more.

From FIG. 10, it is noticed that the substrates reacquire greatly high surface insulation resistance by being surface-lapped. From this fact, understood is that the decrease in resistance is associated with the surface condition of the ferrite substrate.

Figure 11:
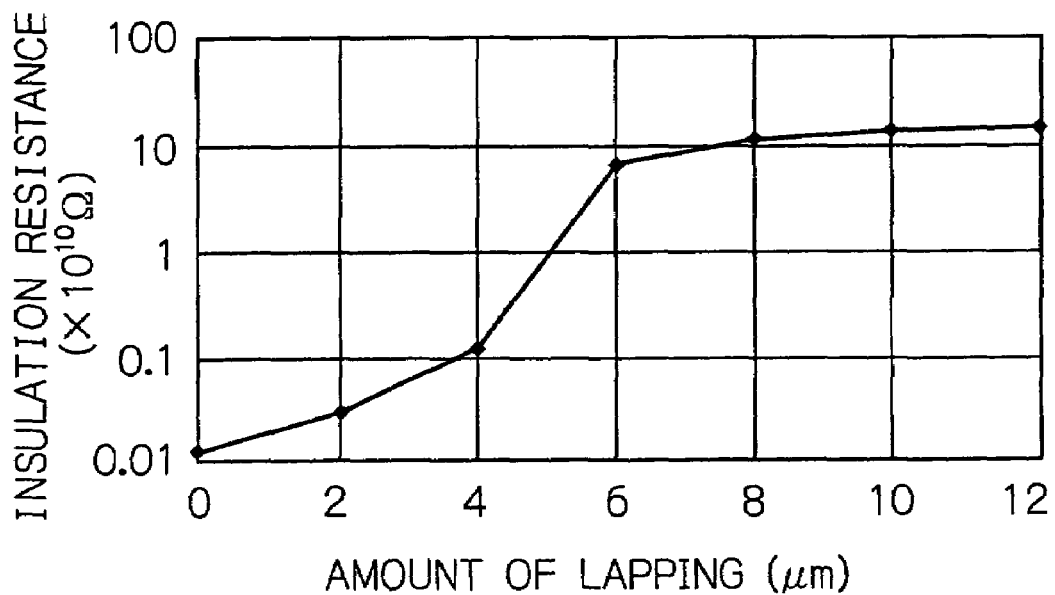
FIG. 11 shows a graph illustrating the measurement results of the relationship between the amount of lapping and surface resistance of the substrate shown in FIG. 10.

FIG. 11 shows a graph illustrating the measurement results of the relationship between the amount of lapping and surface resistance.

From FIG. 11, it is noticed that the surface resistance rises sharply over 5 μm of the amount of lapping. Therefore, preferable is that the amount of surface lapping is set at 5 μm or more.

Figure 12:
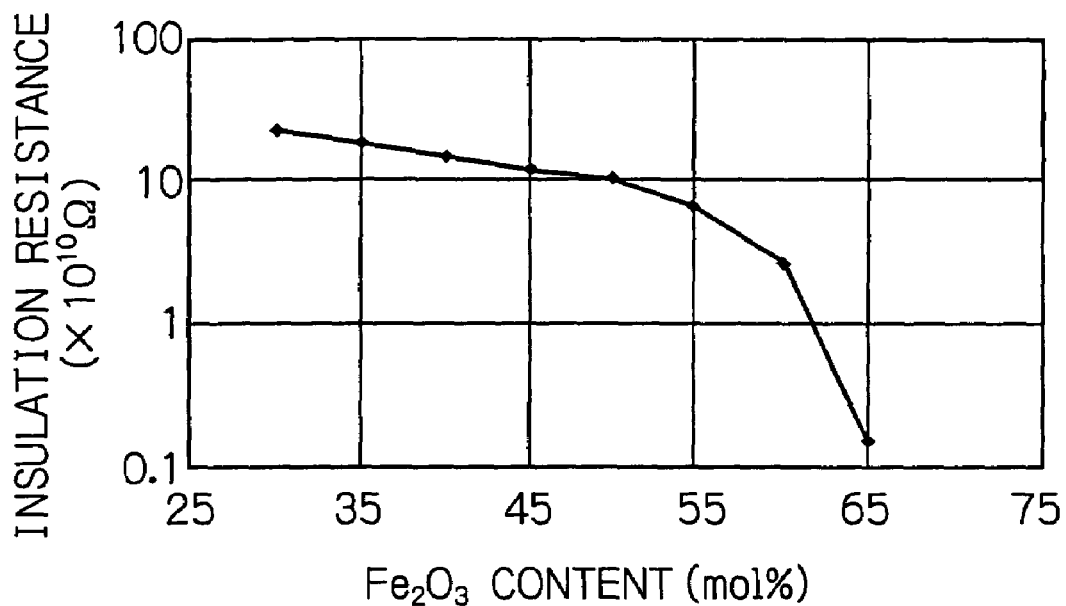
FIG. 12 shows a graph illustrating the measurement results of surface insulation resistance of the surface-lapped ferrite substrates shown in FIG. 10 after being annealed 5 times in vacuum at about 400° C.

FIG. 12 shows a graph illustrating the measurement results of surface insulation resistance of the surface-lapped ferrite substrates shown in FIG. 10 after being annealed 5 times in vacuum at a curing temperature of insulating layers (about 400° C.).

As evidenced by comparing FIG. 12 with FIG. 8, by being surface-lapped with the amount of 5 μm or more, the ferrite substrates annealed for curing insulating layers show smaller decrease in surface resistance. Especially, the substrates indicate high surface resistance values of $10^{10}$ Ω or more in the $Fe_2O_3$ content range of 55 mol % or less. The insulation resistance is dropped sharply over the $Fe_2O_3$ content range.

Therefore, to guarantee the resistance of at least $2\times10^{10}$ Ω, the substrate should have a $Fe_2O_3$ content of 55 mol % or less. Further, according to the measurement results of permeability μ shown in FIG. 5, more preferable is that the substrates have a composition of $Fe_2O_3$: 40 to 55 mol %, NiO: 15 to 30 mol %, ZnO: 20 to 40 mol %.

Figure 13:
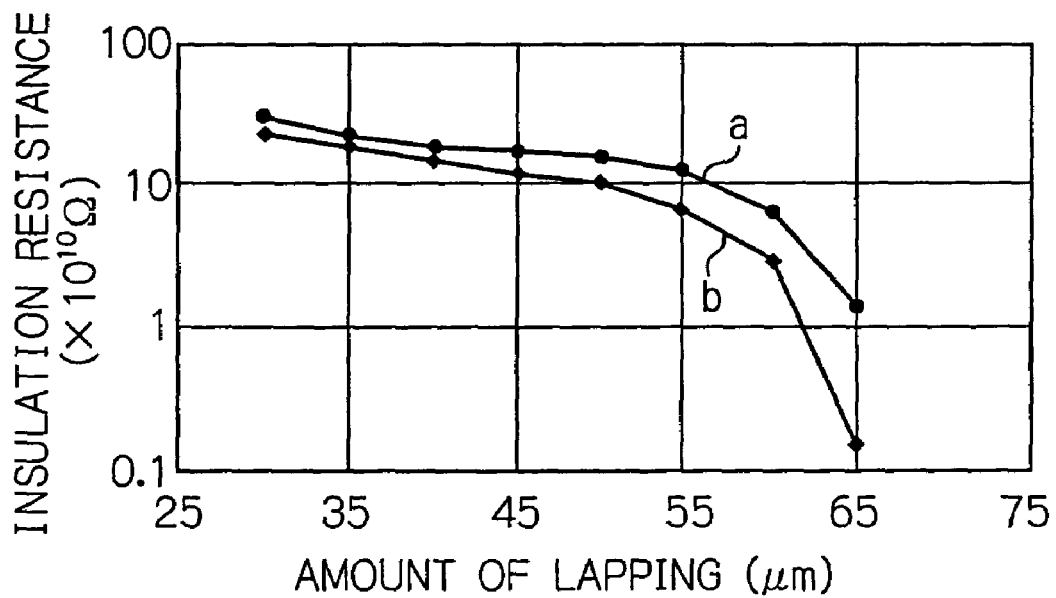
FIG. 13 shows a graph illustrating the measurement results of surface insulation resistance of the ferrite substrates shown in FIG. 12 and NiZn-ferrite substrates produced with addition of Bi$_2$O$_3$ to their basic composition.

FIG. 13 shows a graph illustrating the measurement results of surface insulation resistance of the ferrite substrates shown in FIG. 12 and NiZn-ferrite substrates produced with addition of $Bi_2O_3$ to their basic composition of $Fe_2O_3$, NiO and ZnO. Line a corresponds to the $Bi_2O_3$-added substrates, and line b corresponds to the no-$Bi_2O_3$-added substrates, both of which were annealed in vacuum at 1000° C. and then were surface-lapped with the amount of 8 μm.

It is noted that the surface insulation resistance increases by adding $Bi_2O_3$.

Figure 14:
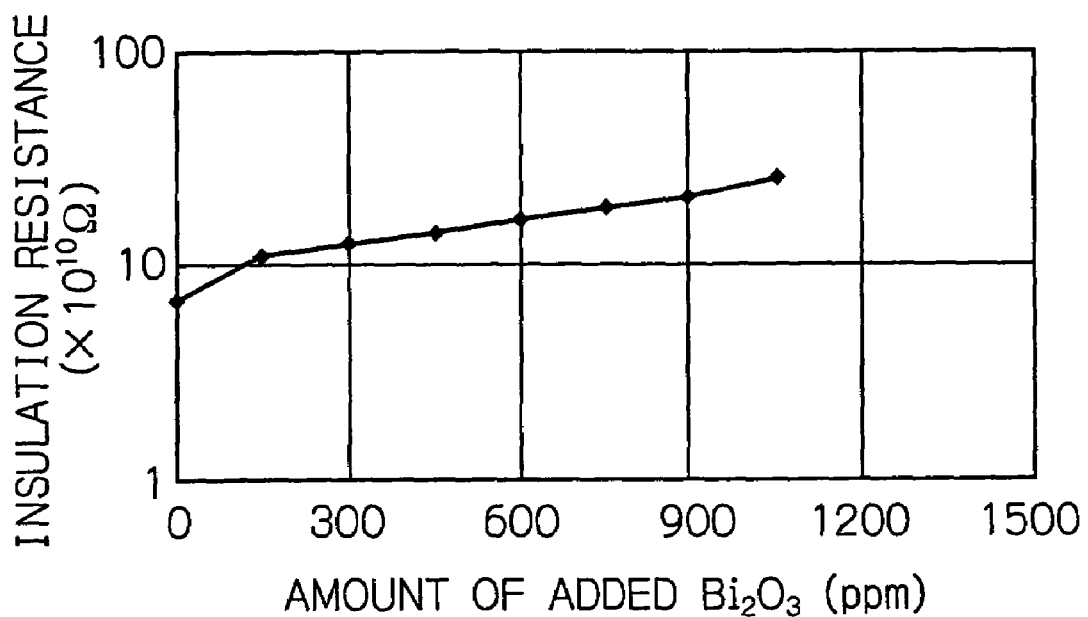
FIG. 14 shows a graph illustrating the measurement results of the relationship between the amount of added Bi$_2$O$_3$ and insulation resistance in the ferrite substrate with Fe$_2$O$_3$ 55 mol %.

FIG. 14 shows a graph illustrating the measurement results of the relationship between the amount of added $Bi_2O_3$ and insulation resistance in the ferrite substrate with $Fe_2O_3$ content of 55 mol %.

From FIG. 14, it is noticed that the insulation resistance is greatly improved by adding 150 ppm or more of $Bi_2O_3$.

Figure 15:
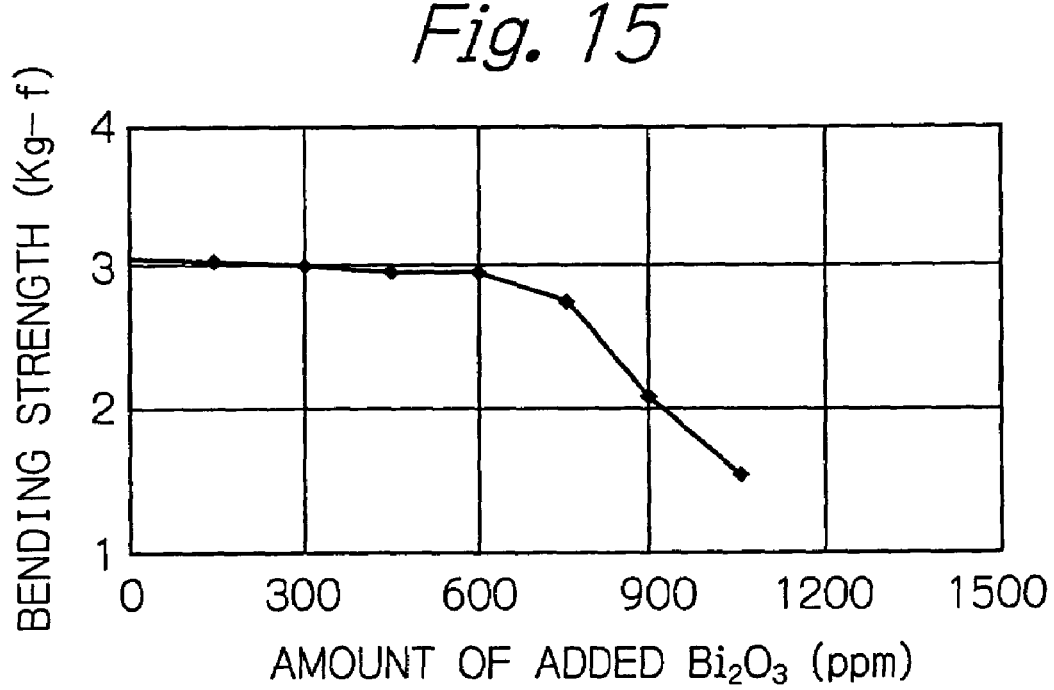
FIG. 15 shows a graph illustrating the measurement results of the relationship between the amount of added Bi$_2$O$_3$ and bending strength in the ferrite substrate with Fe$_2$O$_3$ 55 mol %.

FIG. 15 shows a graph illustrating the measurement results of the relationship between the amount of added $Bi_2O_3$ and bending strength in the ferrite substrate with $Fe_2O_3$ content of 55 mol %. The measurement was based on JIS transverse test. The span of the measuring object was 1.4 mm, and the weighing rate was 30 mm/min.

From FIG. 15, it is noticed that the bending strength falls sharply by adding 750 ppm or more of $Bi_2O_3$.

As mentioned above, understood is that the insulation resistance and the bending strength are optimized together by adding 150 to 750 ppm of $Bi_2O_3$ as the first example of the substrate composition.

Figure 16:
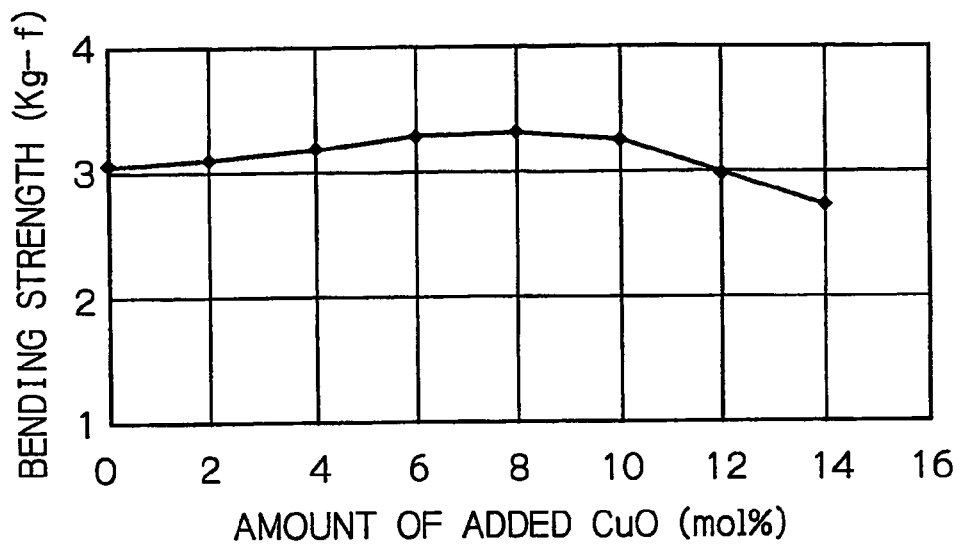
FIG. 16 shows a graph illustrating the measurement results of the relationship between bending strength and the amount of added CuO in the NiZn-ferrite substrates produced with addition of CuO to their basic composition.

FIG. 16 shows a graph illustrating the measurement results of the relationship between bending strength and the amount of added CuO in the NiZn-ferrite substrates produced with addition of CuO to their basic composition of $Fe_2O_3$, NiO and ZnO.

From FIG. 16, it is noticed that the bending strength increases with the amount of added CuO from 5 to 10 mol %.

Figure 17:
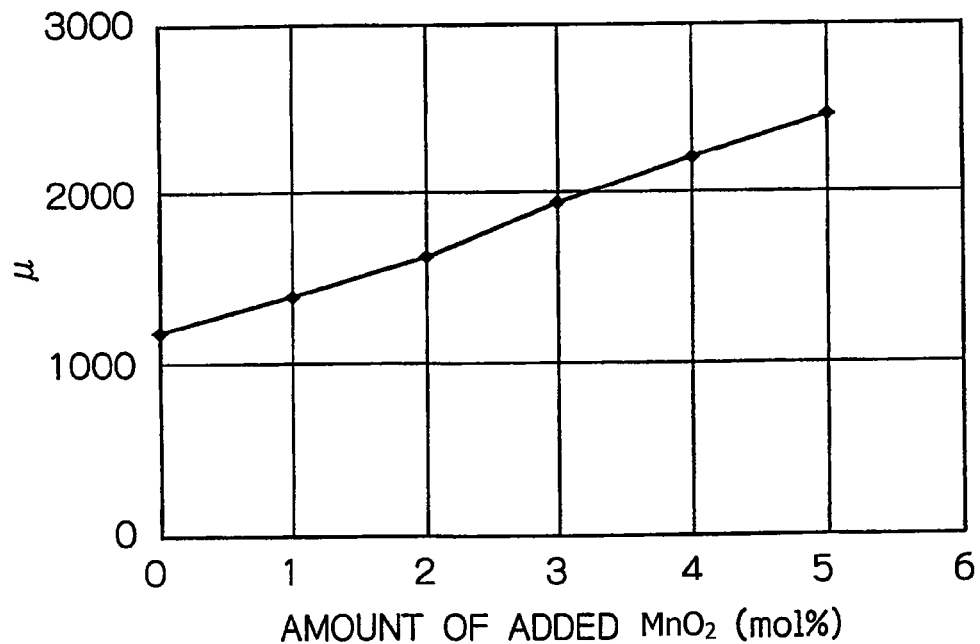
FIG. 17 shows a graph illustrating the measurement results of the relationship between permeability μ and the amount of added MnO$_2$ in the substrates produced with addition of MnO$_2$ to the composition shown in FIG. 16.
Figure 18:
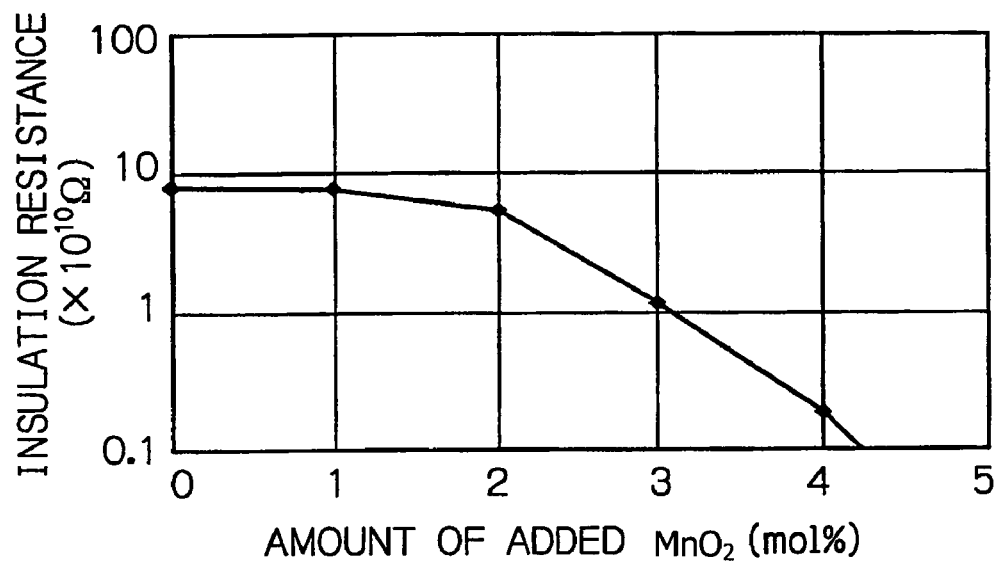
FIG. 18 shows a graph illustrating the measurement results of the relationship between insulation resistance and the amount of added MnO$_2$ in the substrates produced with addition of MnO$_2$ to the composition shown in FIG. 16.

FIG. 17 shows a graph illustrating the measurement results of the relationship between permeability μ and the amount of added $MnO_2$ in the substrates produced with addition of $MnO_2$ to the composition shown in FIG. 16. And FIG. 18 shows a graph illustrating the measurement results of the relationship between insulation resistance and the amount of added $MnO_2$ in the substrates produced with addition of $MnO_2$ to the composition shown in FIG. 16.

As clarified from FIG. 17, the permeability μ increases with the amount of added $MnO_2$ from 0.5 to 5 mol %. However, the substrate insulation resistance falls sharply by adding 2 mol % or more of $MnO_2$, as shown in FIG. 18.

Therefore, the bending strength and the permeability μ can be improved together without the insulation resistance decrease, by adding 5 to 10 mol % of CuO and 0.5 to 2 mol % of $MnO_2$ as the second example of the substrate composition.

Figure 19:
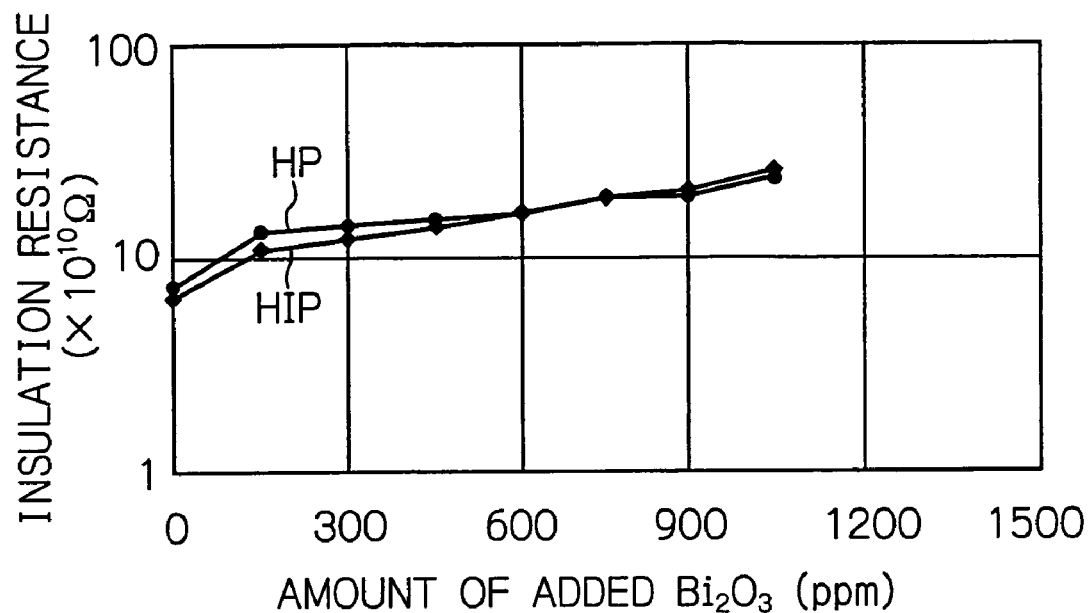
FIG. 19 shows a graph illustrating the measurement results of the relationship between insulation resistance and the amount of added Bi$_2$O$_3$ in the substrates produced by HP and those produced by HIP.
Figure 20:
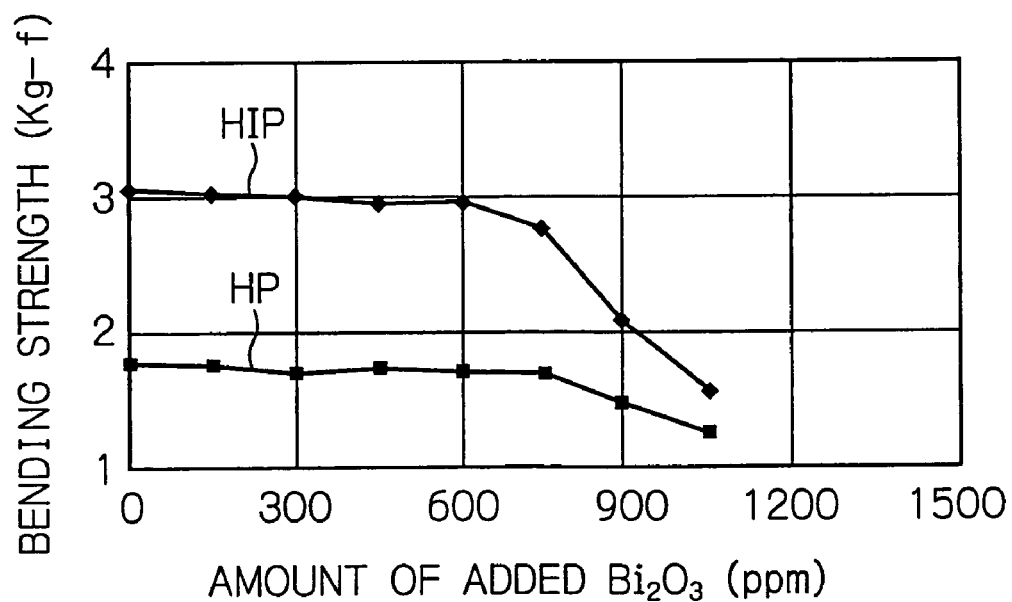
FIG. 20 shows a graph illustrating the measurement results the relationship between bending strength and the amount of added Bi$_2$O$_3$ in the substrates produced by HP and those produced by HIP.

FIG. 19 shows a graph illustrating the measurement results of the relationship between insulation resistance and the amount of added $Bi_2O_3$, in the ferrite substrates produced by conventional hot forming press method (HP) and the ferrite substrates produced by HIP according to the invention. And FIG. 20 shows a graph illustrating the measurement results of the relationship between bending strength and the amount of added $Bi_2O_3$, in the ferrite substrates produced by HP and the ferrite substrates produced by HIP.

As shown in FIG. 19, there is little difference in the insulation resistance between the ferrite substrates produced by HP and those produced by HIP. However, as shown in FIG. 20, the bending strength of the substrate produced by HIP is about time and a half larger than that of the substrate produced by HP. That is, the substrate produced by HIP is harder to crack. The tendency becomes marked as the wafer size becomes larger.

Figure 21:
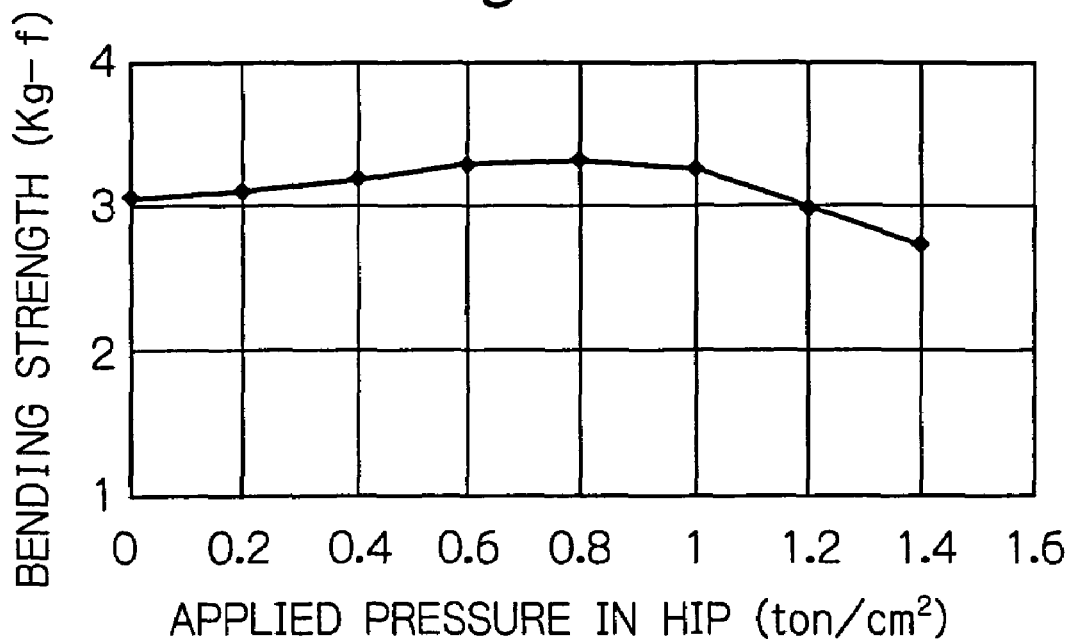
FIG. 21 shows a graph illustrating the measurement results of the relationship between applied pressure in HIP and bending strength of the substrates.
Figure 22:
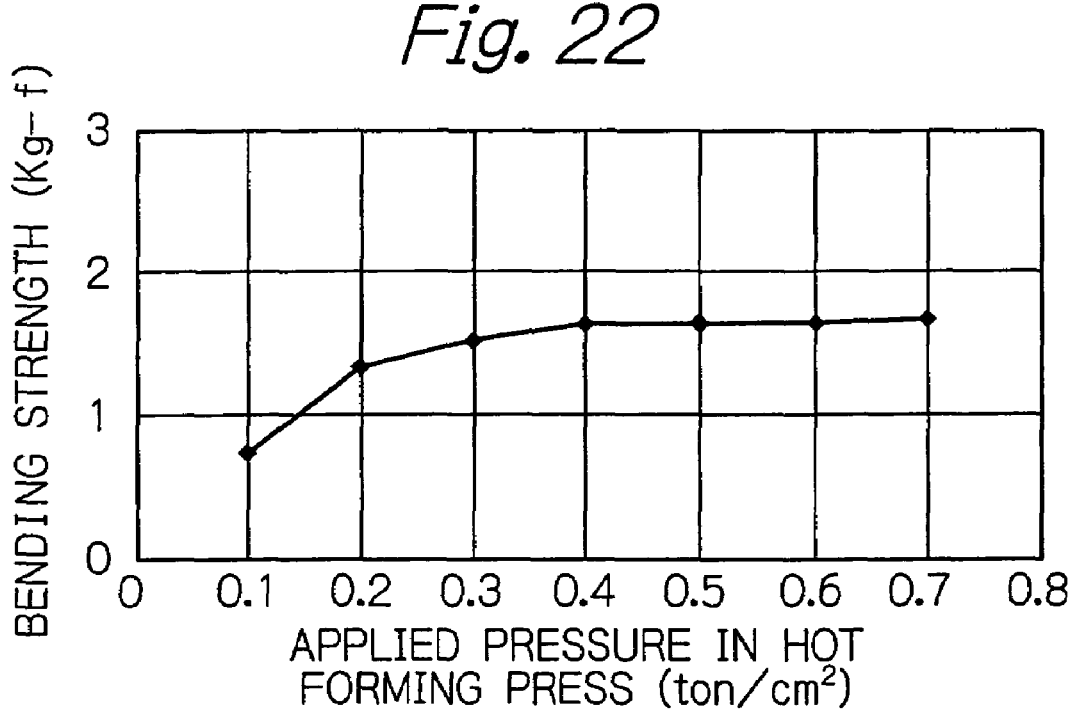
FIG. 22 shows a graph illustrating the measurement results the relationship between applied pressure in HP and bending strength of the substrates.

FIG. 21 shows a graph illustrating the measurement results of the relationship between applied pressure in HIP and bending strength of the substrates. And FIG. 22 shows a graph illustrating the measurement results of the relationship between applied pressure in HP and bending strength of the substrates. The processing temperature in both HP and HIP was 1200° C.

As shown in FIG. 21, it is noticed that the substrates acquire large bending strengths by undergoing HIP under the HIP pressure of 0.5 t/cm² or more. On the other hand, the substrate cannot acquire so large bending strengths by undergoing HP under the increased HP pressure, as shown in FIG. 22.

Table 1 illustrates the observation results of crack occurrence frequency in the 3-inch and 6-inch ferrite substrates (with thickness of 2 mm) produced by HP and the 3-inch and 6-inch ferrite substrates produced by HIP, both of which repeatedly underwent 10 times thermal shocks at 110° C. and 10 times sets of suction and detaching in the carrying process. The number of sample was 20.

The 3-inch substrates produced by HIP show less crack occurrence frequency than those produced by HP. In the 6-inch substrates, there is a larger difference of the frequency between the substrates by HP and those by HIP.

TABLE 1

|  |  | 1st | 2nd | 3rd | 4th | 5th | 6th | 7th | 8th | 9th | 10th |
|---|---|---|---|---|---|---|---|---|---|---|---|
| 3-inch wafer | HP | 0 | 0 | 1 | 1 | 1 | 2 | 2 | 2 | 2 | 2 |
|  | HIP | 0 | 0 | 0 | 0 | 0 | 0 | 0 | 0 | 0 | 0 |
| 6-inch wafer | HP | 1 | 4 | 6 | 6 | 8 | 9 | 12 | 15 | 18 | 19 |
|  | HIP | 0 | 0 | 0 | 0 | 0 | 0 | 0 | 0 | 0 | 1 |

Figure 23:
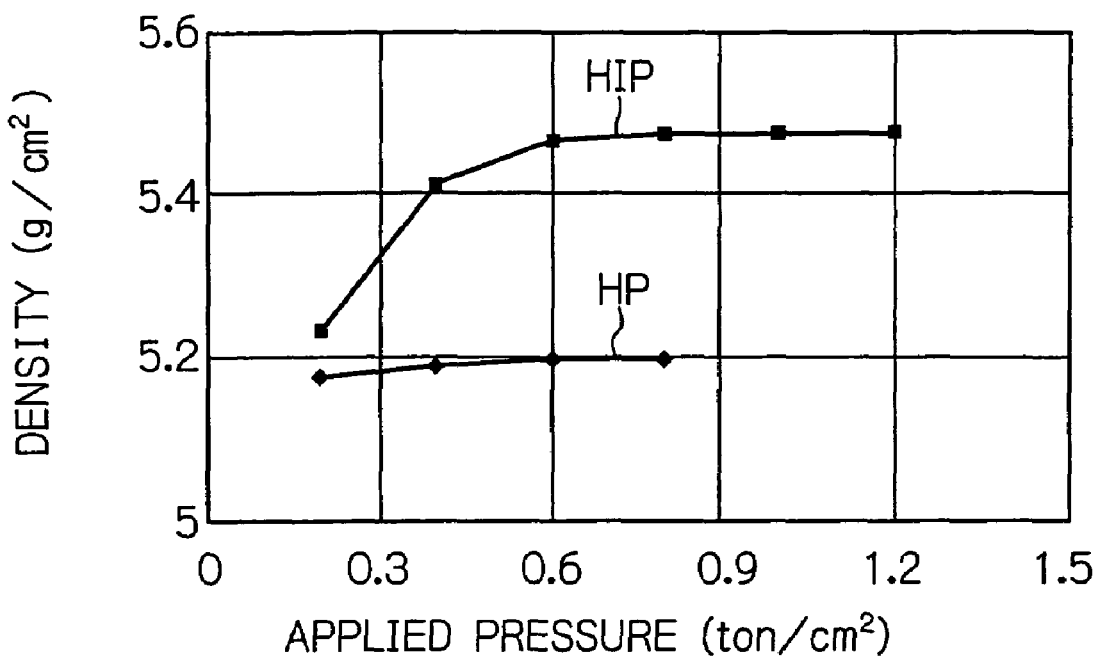
FIG. 23 shows a graph illustrating the measurement results the relationship between density and applied pressure in the ferrite substrates produced by HP and the ferrite substrates produced by HIP, both of which consist basically of Fe$_2$O$_3$, NiO and ZnO.

FIG. 23 shows a graph illustrating the measurement results of the relationship between density and applied pressure in the ferrite substrates produced by HP and the ferrite substrates produced by HIP, both of which consist basically of $Fe_2O_3$, NiO and ZnO.

As shown in FIG. 23, it is noticed that the substrate density is improved by applying HIP to the substrate.

Figure 24:
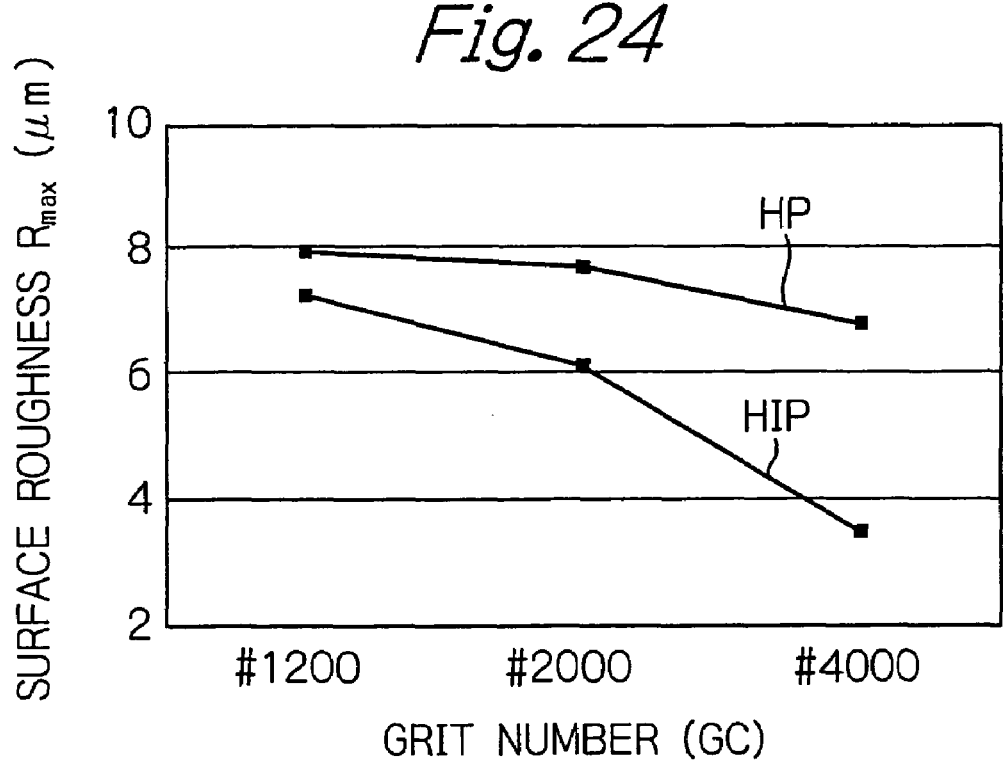
FIG. 24 shows a graph illustrating the measurement results of the relationship between surface roughness and grit number of the used abrasive grain, in the ferrite substrates produced by HP and the ferrite substrates produced by HIP, both of which consist basically of Fe$_2$O$_3$, NiO and ZnO.

FIG. 24 shows a graph illustrating the measurement results of the relationship between surface roughness and grit number of the used abrasive grain, in the ferrite substrates produced by HP and the ferrite substrates produced by HIP, both of which consist basically of $Fe_2O_3$, NiO and ZnO. The crystalline grain size of both ferrite substrates was 5 μm, and #2000 SiC was used as abrasive grain for lapping of both substrates.

As shown in FIG. 24, it is noticed that the surface roughness decreases greatly by application of HIP to the substrate. Further, the surface roughness of the substrates produced by HP shows less change as the used abrasive grain becomes fine according to the grit number change from #1200 to #2000 and to #4000, whereas the surface roughness of the substrates produced by HIP is improved as the used abrasive grain becomes fine.

Figure 25:
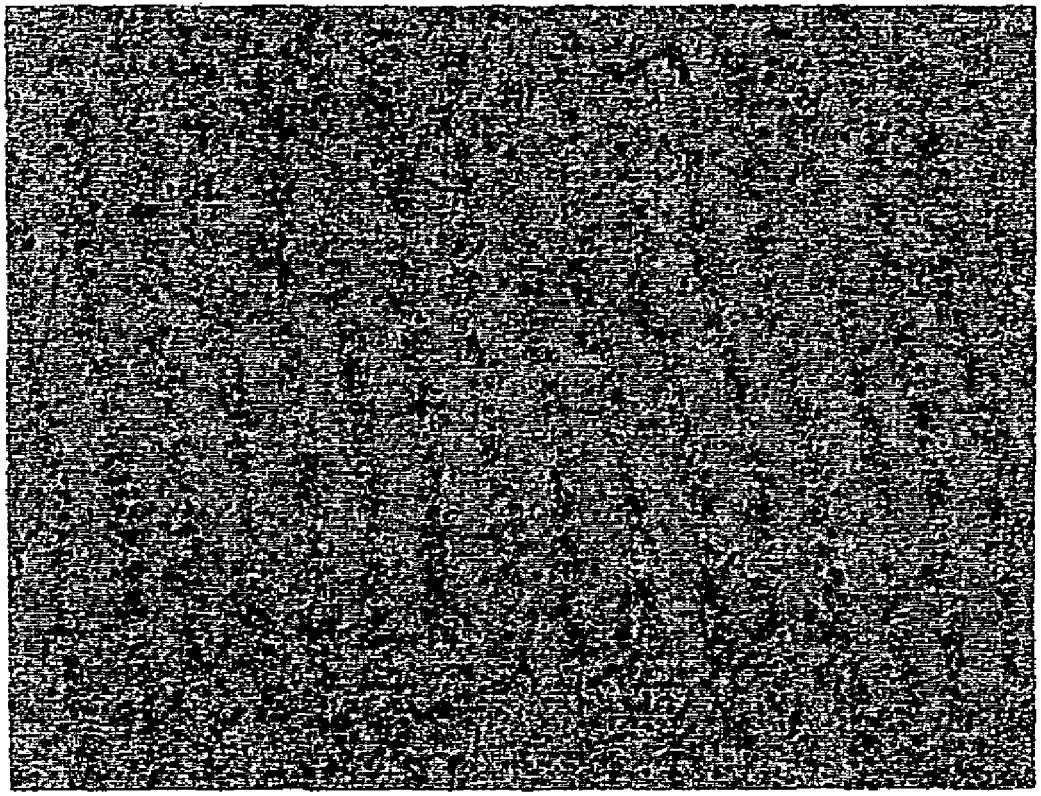
FIG. 25 shows an optical microscope photograph of the surface of the ferrite substrate that was produced by HIP.
Figure 26:
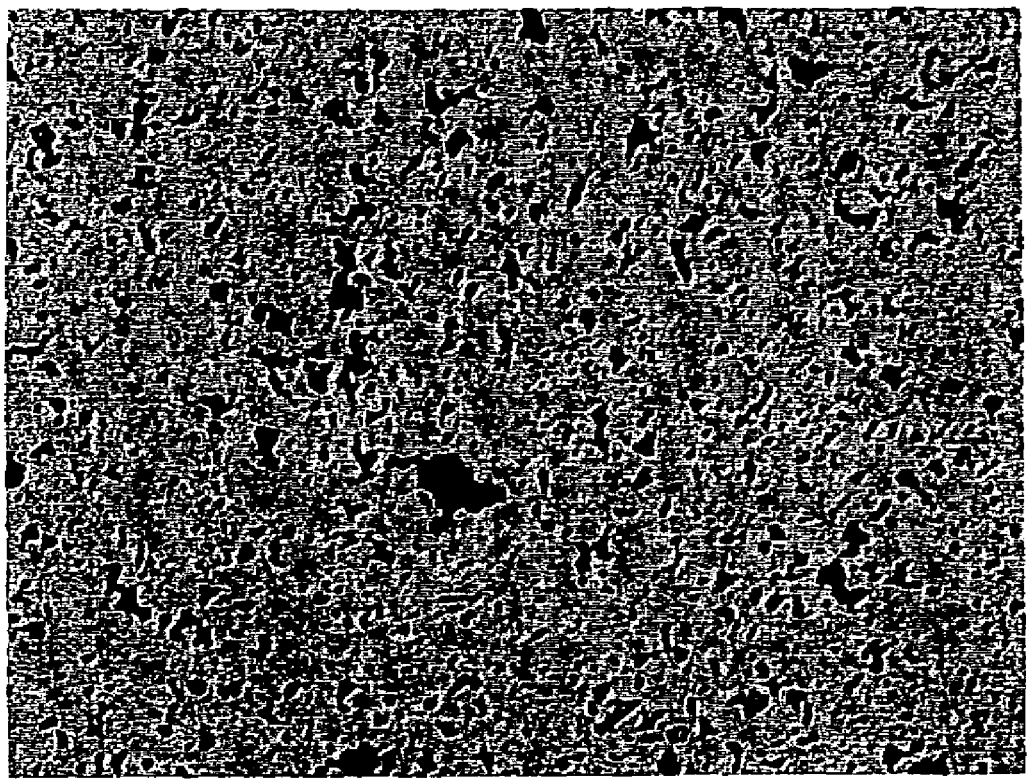
FIG. 26 shows an optical microscope photograph of the surface of the ferrite substrate that was produced by HP.
Figure 27:
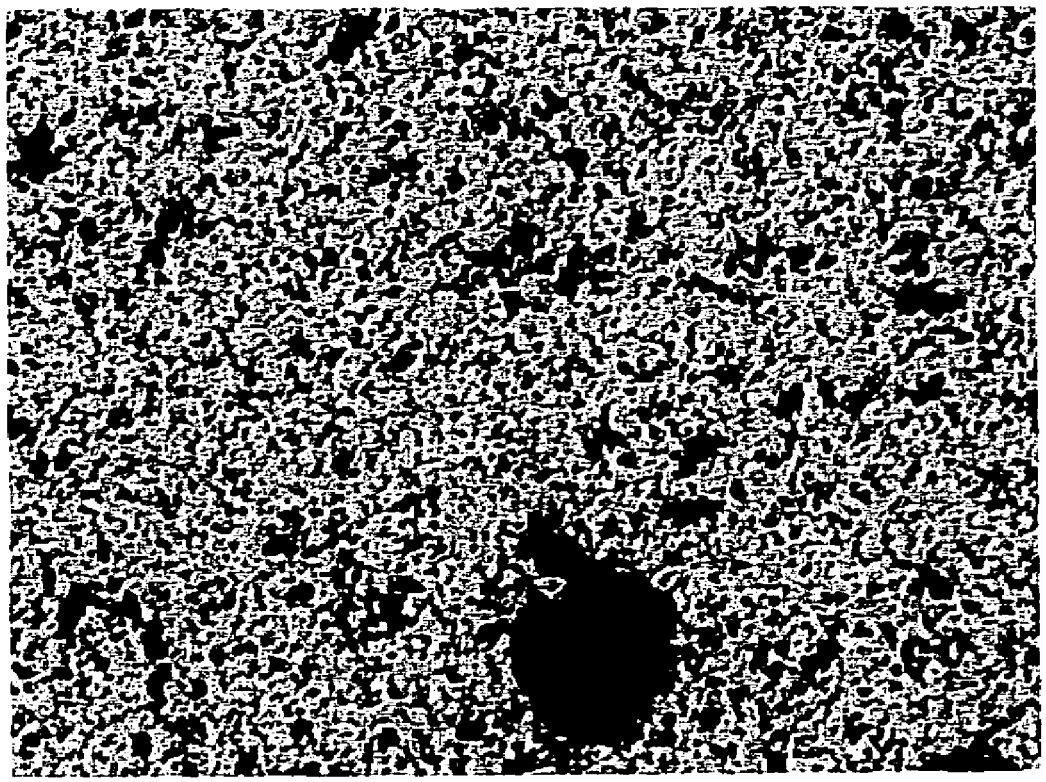
FIG. 27 shows an optical microscope photograph of the surface of the ferrite substrate that was produced by sheet manufacturing method.

FIG. 25 shows an optical microscope photograph (×220) of the surface of the substrate that was processed by HIP and was lapped with #6000 diamond, and FIG. 26 shows an optical microscope photograph (×220) of the surface of the substrate that was processed by HP and lapped with #6000 diamond. Further, FIG. 27 shows an optical microscope photograph (×220) of the surface of the substrate that was processed by sheet manufacturing method and was lapped with #6000 diamond. The crystalline grain sizes of all the ferrite substrates were 5-6 μm.

The surface of the ferrite substrate produced by HIP as shown in FIG. 25 has almost no pin holes, whereas the surface of the ferrite substrate produced by conventional HP as shown in FIG. 26 or produced by HP after sheet manufacturing has some voids. Further, the surface of the ferrite substrate produced by sheet manufacturing method as shown in FIG. 27 has some large vacancies from which the ferrite particles were detached.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:
1. A ferrite substrate comprising:
   a ferrite composition of di-iron trioxide: 40 to 55 mol %, nickel oxide: 5 to 35 mol %, zinc oxide: 10 to 40 mol %, cupric oxide: 5 to 10 mol %, and manganese dioxide: 0.5 to 2 mol %,
   wherein the ferrite composition has a densified crystalline structure having a bending strength in a range of more than 2 kg-f and less than 4 kg-f developed by hot isostatic pressing; and a surface resistance in a range from $1\times10^{10}$ $\Omega$ to $15\times10^{10}$ $\Omega$.

2. The ferrite substrate as claimed in claim 1, wherein said ferrite composition is di-iron trioxide: 40 to 55 mol %, nickel oxide: 15 to 30 mol %, zinc oxide: 20 to 40 mol %, cupric oxide: 5 to 10 mol %, and manganese dioxide: 0.5 to 2 mol %.

3. The ferrite substrate as claimed in claim 1, wherein said substrate is a wafer with diameter of 3 inches or more.

4. The ferrite substrate as claimed in claim 1, wherein said ferrite substrate comprises said surface resistance on a surface lapped by at least 5 μm after an annealing performed after hot isostatic pressing.

5. A thin film common mode filter using a ferrite substrate comprising:
   a ferrite composition of di-iron trioxide: 40 to 55 mol %, nickel oxide: 5 to 35 mol %, zinc oxide: 10 to 40 mol %, cupric oxide: 5 to 10 mol %, and manganese dioxide: 0.5 to 2 mol %,
   wherein the ferrite composition has a densified crystalline structure having a bending strength in a range of more than 2 kg-f and less than 4 kg-f developed by hot isostatic pressing; and a surface resistance in a range from $1\times10^{10}$ $\Omega$ to $15\times10^{10}$ $\Omega$.

6. The thin film common mode filter as claimed in claim 5, wherein said ferrite composition is di-iron trioxide: 40 to 55 mol %, nickel oxide: 15 to 30 mol %, zinc oxide: 20 to 40 mol %, cupric oxide: 5 to 10 mol %, and manganese dioxide: 0.5 to 2 mol %.

7. The thin film common mode filter as claimed in claim 5, wherein said substrate is a wafer with diameter of 3 inches or more.

8. The thin film common mode filter as claimed in claim 5, wherein said ferrite substrate comprises said surface resistance on a surface lapped by at least 5 μm after an annealing performed after hot isostatic pressing.

9. A thin film common mode filter array using a ferrite substrate comprising:
   a ferrite composition of di-iron trioxide: 40 to 55 mol %, nickel oxide: 5 to 35 mol %, zinc oxide: 10 to 40 mol %, cupric oxide: 5 to 10 mol %, and manganese dioxide: 0.5 to 2 mol %,
   wherein the ferrite composition has a densified crystalline structure having a bending strength in a range of more than 2 kg-f and less than 4 kg-f developed by hot isostatic pressing; and a surface resistance in a range from $1\times10^{10}$ $\Omega$ to $15\times10^{10}$ $\Omega$.

10. The thin film common mode filter array as claimed in claim 9, wherein said ferrite composition is di-iron trioxide: 40 to 55 mol %, nickel oxide: 15 to 30 mol %, zinc oxide: 20 to 40 mol %, cupric oxide: 5 to 10 mol %, and manganese dioxide: 0.5 to 2 mol %.

11. The thin film common mode filter array as claimed in claim 9, wherein said substrate is a wafer with diameter of 3 inches or more.

12. The thin film common mode filter array as claimed in claim 9, wherein said ferrite substrate comprises said surface resistance on a surface lapped by at least 5 μm after an annealing performed after hot isostatic pressing.

* * * * *